(12) United States Patent
Dalsgaard et al.

(10) Patent No.: US 9,565,647 B2
(45) Date of Patent: Feb. 7, 2017

(54) METHOD AND APPARATUS FOR IMPLEMENTING A TIME-ALIGNMENT GUARD TIMER

(71) Applicant: NOKIA CORPORATION NOKIA TECHNOLOGIES OY, Espoo (FI)

(72) Inventors: Lars Dalsgaard, Oulu (FI); Jorma Kaikkonen, Oulu (FI); Klaus Pedersen, Aalborg (DK)

(73) Assignee: NOKIA TECHNOLOGIES OY, Espoo (FI)

(*) Notice: Subject to any disclaimer, the term of this patent is extended or adjusted under 35 U.S.C. 154(b) by 89 days.

(21) Appl. No.: 14/611,892

(22) Filed: Feb. 2, 2015

(65) Prior Publication Data

US 2016/0227503 A1  Aug. 4, 2016

(51) Int. Cl.
*H04W 72/04* (2009.01)
*H04W 56/00* (2009.01)
*H04L 5/00* (2006.01)
*H04W 36/00* (2009.01)

(52) U.S. Cl.
CPC ........ *H04W 56/0045* (2013.01); *H04L 5/0058* (2013.01); *H04W 36/0005* (2013.01)

(58) Field of Classification Search
CPC .......... H04W 56/001; H04W 56/0015; H04W 56/002; H04W 56/004; H04W 56/0045; H04W 56/005; H04W 56/0055; H04J 3/0638; H04J 3/0632; H04J 3/0602; H04J 3/0658; H04J 3/0682; H04L 7/00; H04L 12/43; H04B 1/7073; H04B 1/7183; H04B 7/19
See application file for complete search history.

(56) References Cited

U.S. PATENT DOCUMENTS

| 8,976,780 B2 * | 3/2015 | Cai ..................... H04W 72/042 370/216 |
| 2005/0124345 A1 * | 6/2005 | Laroia .................. H04W 36/06 455/437 |
| 2012/0033613 A1 | 2/2012 | Lin et al. |

(Continued)

FOREIGN PATENT DOCUMENTS

WO  2010/104957 A2  9/2010

OTHER PUBLICATIONS

International Search Report and Written Opinion application No. PCT/FI2016/050031 mailed May 4, 2016.

*Primary Examiner* — Mohamed Kamara
(74) *Attorney, Agent, or Firm* — Squire Patton Boggs (US) LLP

(57) ABSTRACT

A method and apparatus may include receiving a time-alignment value for a time-alignment timer. The method may also include starting the time-alignment timer. The method may also include transmitting one or more uplink transmissions. The uplink transmission is transmitted while the time-alignment timer is running. The method may also include receiving an updated time-alignment while the time-alignment timer is running, if the timing of the uplink transmission is determined to be correct. The method may also include applying the updated time-alignment, if the updated time-alignment is received. The method may also include stopping uplink transmissions, if no updated time alignment is received.

14 Claims, 10 Drawing Sheets

(56) References Cited

U.S. PATENT DOCUMENTS

| | | | |
|---|---|---|---|
| 2013/0100938 A1* | 4/2013 | Kwon | H04W 56/0045 370/336 |
| 2013/0121315 A1* | 5/2013 | Langereis | H04W 56/0045 370/336 |
| 2013/0258958 A1 | 10/2013 | Dinan | |
| 2014/0029586 A1* | 1/2014 | Loehr | H04W 56/0045 370/336 |
| 2014/0086219 A1* | 3/2014 | Suzuki | H04W 56/0005 370/336 |

* cited by examiner

| Downlink Bandwidth (MHz) | $T_x$ |
|---|---|
| 1.4 | 24*Ts |
| XI | 12*Ts |

Note: Ts is the basic timing unit defined in TS 36.211

Fig. 5

METHOD AND APPARATUS FOR IMPLEMENTING A TIME-ALIGNMENT GUARD TIMER

BACKGROUND

Field

Embodiments of the present invention relate to implementing a time-alignment guard timer (TAgT).

Description of the Related Art

Long-term Evolution (LTE) is a standard for wireless communication that seeks to provide improved speed and capacity for wireless communications by using new modulation/signal processing techniques. The standard was proposed by the $3^{rd}$ Generation Partnership Project (3GPP), and is based upon previous network technologies. Since its inception, LTE has seen extensive deployment in a wide variety of contexts involving the communication of data.

SUMMARY

According to a first embodiment, a method may comprise receiving, by a user equipment, a time-alignment value for a time-alignment timer. The method may also comprise starting the time-alignment timer. The method may also comprise transmitting one or more uplink transmissions. The uplink transmission is transmitted while the time-alignment timer is running. The method may also comprise receiving an updated time-alignment while the time-alignment timer is running, if the timing of the uplink transmission is determined to be correct. The method may also comprise applying the updated time-alignment, if the updated time-alignment is received. The method may also comprise stopping uplink transmissions, if no updated time alignment is received.

In the method of the first embodiment, the method may further comprise receiving a handover command. The handover command indicates a random-access-less handover.

In the method of the first embodiment, the starting the time-alignment-timer comprises starting RACHlessTAT.

In the method of the first embodiment, the receiving the time-alignment value comprises receiving from a first evolved Node B. The transmitting the uplink transmission comprises transmitting to a second evolved Node B, and the second evolved Node B determines if the timing of the uplink transmission is correct.

In the method of the first embodiment, the receiving the time-alignment value comprises receiving from a second evolved Node B. The transmitting the uplink transmission comprises transmitting to the second evolved Node B, and the second evolved Node B determines if the timing of the uplink transmission is correct.

According to a second embodiment, an apparatus may comprise at least one processor. The apparatus may also comprise at least one memory including computer program code. The at least one memory and the computer program code may be configured, with the at least one processor, to cause the apparatus at least to receive a time-alignment value for a time-alignment timer. The apparatus may also be caused to start the time-alignment timer. The apparatus may also be caused to transmit one or more uplink transmissions. The uplink transmission is transmitted while the time-alignment timer is running. The apparatus may also be caused to receive an updated time-alignment while the time-alignment timer is running, if the timing of the uplink transmission is determined to be correct. The apparatus may also be caused to apply the updated time-alignment, if the updated time-alignment is received. The apparatus may also be caused to stop uplink transmissions, if no updated time alignment is received.

In the apparatus of the second embodiment, the apparatus is further caused to receive a handover command. The handover command indicates a random-access-less handover.

In the apparatus of the second embodiment, the starting the time-alignment-timer comprises starting RACHlessTAT.

In the apparatus of the second embodiment, the receiving the time-alignment value comprises receiving from a first evolved Node B, the transmitting the uplink transmission comprises transmitting to a second evolved Node B, and the second evolved Node B determines if the timing of the uplink transmission is correct.

In the apparatus of the second embodiment, the receiving the time-alignment value comprises receiving from a second evolved Node B. The transmitting the uplink transmission comprises transmitting to the second evolved Node B, and the second evolved Node B determines if the timing of the uplink transmission is correct.

According to a third embodiment, a computer program may be embodied on a computer readable medium. The computer program may be configured to control a processor to perform a method according to the first embodiment.

According to a fourth embodiment, a method may comprise receiving, by a network node, an uplink transmission from a user equipment. The uplink transmission is transmitted while a time-alignment-timer is running. The method may also comprise determining whether the timing of the uplink transmission is correct. The method may also comprise transmitting an updated time-alignment to the user equipment, if the timing of the uplink transmission is determined to be correct.

In the method of the fourth embodiment, the receiving the uplink transmission from the user equipment comprises receiving the uplink transmission after the user equipment receives a handover command. The handover command indicates a random-access-less handover.

In the method of the fourth embodiment, the receiving the uplink transmission comprises receiving the uplink transmission while a RACHlessTAT is running.

According to a fifth embodiment, an apparatus may comprise at least one processor. The apparatus may comprise at least one memory including computer program code. The at least one memory and the computer program code may be configured, with the at least one processor, to cause the apparatus at least to receive an uplink transmission from a user equipment. The uplink transmission is transmitted while a time-alignment-timer is running. The apparatus may also be caused to determine whether the timing of the uplink transmission is correct. The apparatus may also be caused to transmit an updated time-alignment to the user equipment, if the timing of the uplink transmission is determined to be correct.

In the apparatus of the fifth embodiment, the receiving the uplink transmission from the user equipment comprises receiving the uplink transmission after the user equipment receives a handover command. The handover command indicates a random-access-less handover.

In the apparatus of the fifth embodiment, the receiving the uplink transmission comprises receiving the uplink transmission while a RACHlessTAT is running.

According to a sixth embodiment, a computer program may be embodied on a computer readable medium. The computer program may be configured to control a processor to perform a method according to the fourth embodiment.

BRIEF DESCRIPTION OF THE DRAWINGS

For proper understanding of the invention, reference should be made to the accompanying drawings, wherein:

FIG. 5 illustrates example transmit-timing requirements in accordance with certain embodiments of the present invention.

DETAILED DESCRIPTION

Figure 1:
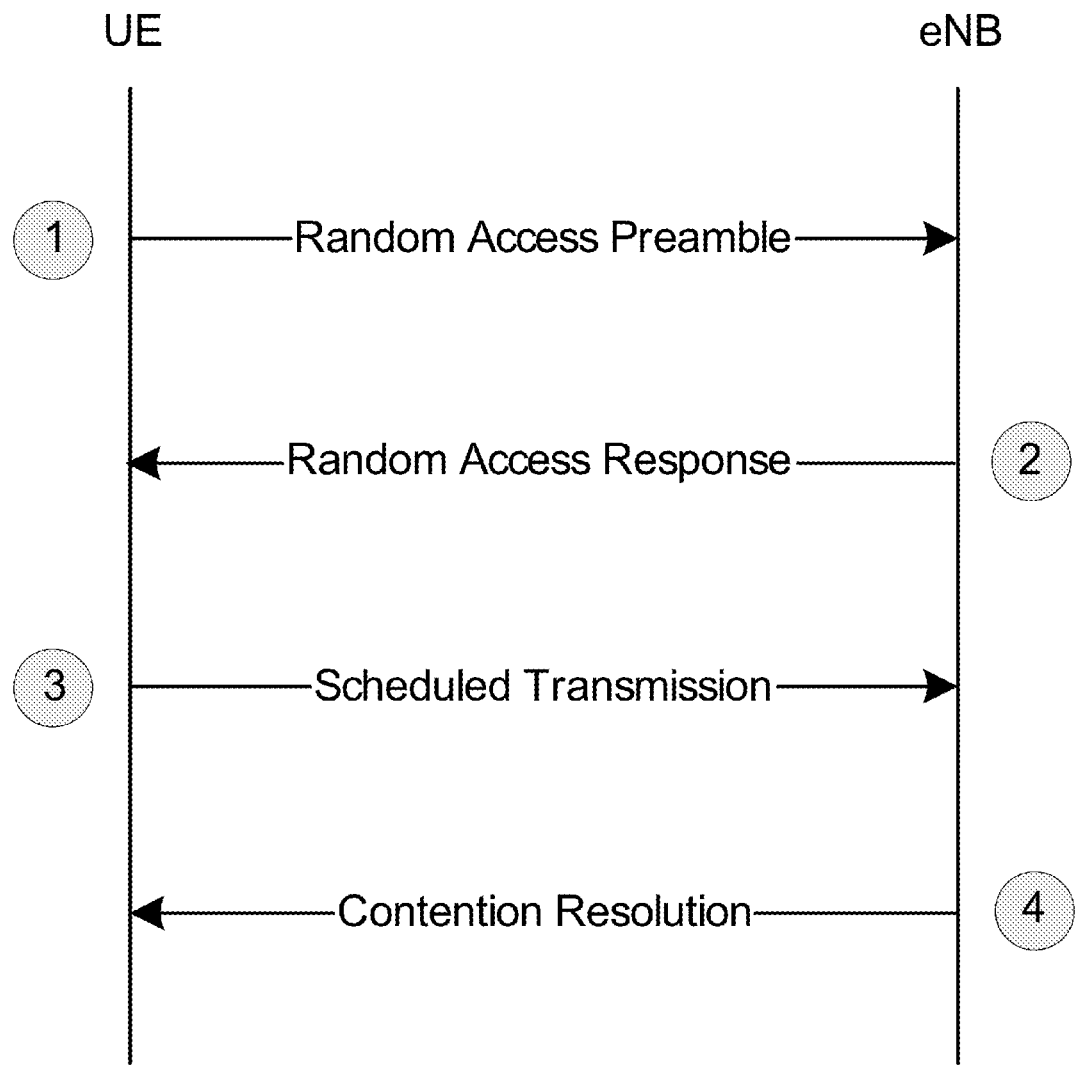
FIG. 1 illustrates an example contention-based random access procedure.

Certain embodiments of the present invention relate to implementing a time-alignment guard timer. A new work item (WI) has been proposed that is titled "Improved Mobility for Synchronous LTE Networks (MobSync)." This work item indicates that there generally have not been any efforts directed to reducing handover interruption time and to reducing random-access overhead for every handover. There may be opportunities for reducing handover interruption time for cases with synchronized networks. Reducing handover interruption time may be beneficial for many of the currently defined features and may provide gain, for example, together with many of the LTE enhancements that have recently been standardized or are in the process of being standardized. Some example enhancements include further enhanced inter-cell interference cancellation ((f)eICIC), network-assisted interference cancellation and suppression (NAICS), enhanced MBMS (eMBMS), and/or small cell enhancements.

Therefore, it was desirable to start a work item that specifies handover solutions between time-synchronized cells, with the objective of reducing the handover interruption time and/or reducing the random-access overhead. As such, it may be desirable to specify methods that use synchronous random-access-channel-less (RACH-less) handover mechanisms with or enabling shorter data interruption time.

One objective of the work item is to specify a synchronized handover that reduces interruption of data transmission during handover. Another objective is to specify an option for avoiding random access in the target cell during synchronized handover. The work item generally focuses on procedures of synchronized network (however, procedures of asynchronous networks are not necessarily precluded from the work item).

The new Release 13 work item proposal ("Improved Mobility for Synchronous LTE Networks (MobSync)") includes the option for avoiding random access in the target cell during handover—named synchronized handover. This means that an enhanced Node B (eNB) does not perform calculation of a timing-advance (TA) value to be assigned to a UE during the handover procedure. There may be multiple options with regard to estimating/calculating the TA value to be used after handover (HO), especially in synchronized HO scenarios. In general, when estimating/calculating the TA value, it is no longer based on a Random-Access (RA) preamble/burst transmitted by the UE in a new source cell. The TA value that is applied in the new source cell is an estimated value, which may possibly be incorrect in certain situations.

A transmission that is transmitted by a UE (where the UE transmits with a wrong TA) generally cannot be correctly received by a base station. For example, the data of the transmission will generally not be received within an expected window of uplink (UL) transmissions, and the decoding of the data at the base station will likely fail. Instead of properly receiving/transmitting UL data (where the UL data corresponds to the transmission with the wrong TA), the UL transmission instead contributes to the UL interference experienced at the base station. It may be desirable to have a method which handles the situations where the TA used/applied by the UE (in the new source cell after the HO) is not correct.

In current evolved-UMTS-Terrestrial-Radio-Access-Network (E-UTRAN), the uplink (UL) timing advance (TA) to be used by the UE (after handover (HO), for example) is determined by configuring the UE to send a random access (RA) burst in UL after the HO. After the eNB receives the RA burst, the eNB calculates the TA to be used by the UE. The network then sends the TA value to the UE in an RA response message. The UE receives the RA response message from the eNB, and the UE applies the TA value.

The overall high-level Random-Access-Channel (RACH) procedure and handover procedures are described in 3GPP Technical Specification 36.300, and in FIG. 1, for the basic contention-based random access procedure. There is also the option of using a non-contention-based random access procedure.

As such, with the current procedure of re-gaining/gaining the UL synchronization, the serving eNB is responsible for calculating the TA value to be applied by the UE. This TA value is then sent to the UE, for example, in a random-access response (RAR) message.

Figure 2:
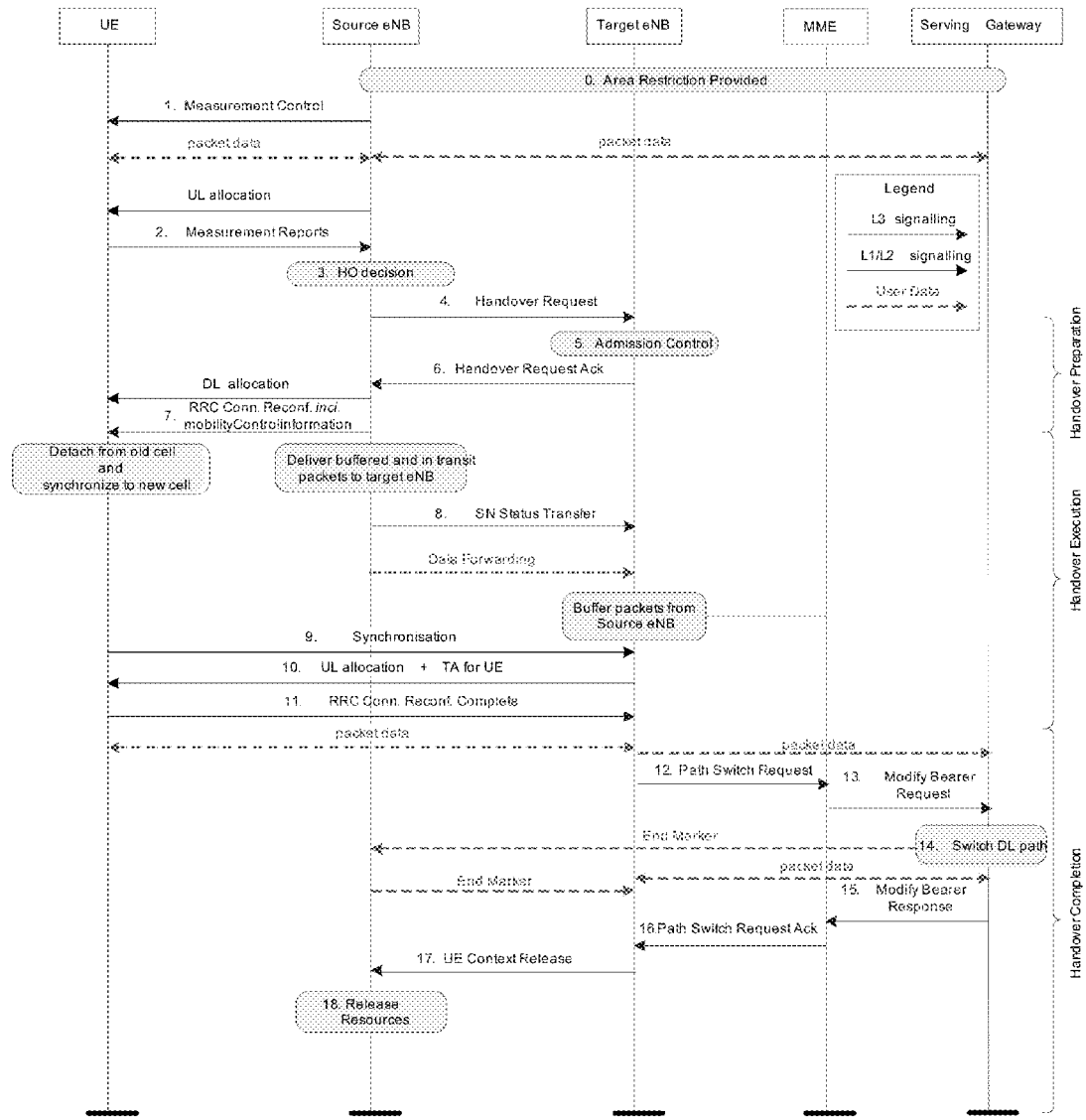
FIG. 2 illustrates an example handover procedure as described in 3GPP Technical Specification 36.300.

FIG. 2 illustrates an example handover procedure as described in 3GPP Technical Specification 36.300. FIG. 2 illustrates an example case where RACHlessHO could be used in conjunction with the current handover procedure (control plane), as described in more detail below. The earlier mentioned Release 13 WI ("MobSync") is directed to reducing the HO interruption time by enabling a HO procedure where step 9 or part of step 9 (of FIG. 2) is not necessary. Instead, the UL/DL allocations are possibly determined/obtained already from step 10 of FIG. 2 (without needing to wait for TA).

Certain embodiments of the present invention may introduce a timing alignment/advance guard timer (TAgT) which may be used in connection with, for example, a RACH-less handover procedure.

This timer may comprise a temporary short TAT. The TAgT may be used to determine the validity of the TA value that is used, for example, in connection with the RACH-less HO. This new timer may be defined separately from the existing TAT timer. This new timer may be considered to be a guard timer that is referred to as "RACHlessTAT." This new timer may ensure that, if/when a UE uses an incorrect TA, the incorrect TA is only used for a limited time.

Additionally, with certain embodiments of the present invention, the network may provide a new or updated TA value to be used by the UE, before the RACHlessTAT expires. If the network does not provide an updated TA during this time before expiration, the RACHlessTAT will expire and the UE will, for example, act as when the TAT expires. When the TAT expires, the UE may stop UL transmissions and may release the UL resources. If the network sends an updated TA prior to expiration of the RACHlessTAT, the UE applies this new updated TA value, stops the RACHlessTAT, and applies the updated (existing) TAT according to, for example, normal/existing procedure.

Certain embodiments of the present invention may be used in conjunction with E-UTRAN, for example. Other embodiments of the present invention may be used in conjunction with other possible implementations or with other specified means. Certain embodiments of the present invention may be used in conjunction with handover as an example case, but other embodiments of the present invention may be applied in connection with other features or procedures.

When the UE receives the handover command from a source eNB, this message could include some additional information that enables the UE to recognize that the handover is a RA-less handover, or more generally that RA is not needed prior to accessing. RA is not needed prior to accessing, for example, if the UE does not start RA burst transmission in the target cell. Instead of RA burst transmission, the UE can start UL transmissions based on the TA value available (or being made available) for the UE to be applied in the new cell. This TA may be supplied to the UE by any means in either the current source cell or a new source cell (such as a target cell).

Additionally, with certain embodiments of the present invention, the UE may also receive/have a new TAT timer (received via dedicated signaling or as a part of broadcast information, for example) to be applied for a shorter time period after (or during) the handover. This TAT (such as RACHlessTAT) may be used to ensure/guard the validity of the TA value, where the TA value is calculated or provided in connection with the RACH less handover procedure.

The RACHlessTAT may be used to ensure that, in case the calculated or estimated TA value (that is used in connection with the RACH less handover procedure) is not correct, the RACHlessTAT timer will expire and thus ensure that the UE will stop transmitting UL transmissions (using the incorrect TA). In case the timer expires, the UE could behave as described in 36.321, for example, stop further UL transmissions and release allocated UL resourced.

In order to avoid expiration of RACHlessTAT, the eNB may send a new timing advance command (such as a Medium-Access Control (MAC) (or similar) command) to the UE. When the UE receives this command, the UE may stop the RACHlessTAT, apply the new TA value, start the TAT, and behave as described in 36.321. In case the eNB does not send a new/updated TA command (such as a Medium-Access Control (MAC) (or similar) command) to the UE, before the RACHlessTAT expires, the UE could behave in a same or similar manner as described in 36.321. For example, the UE may release allocated UL resources and/or stop any Ul transmission.

Figure 3:
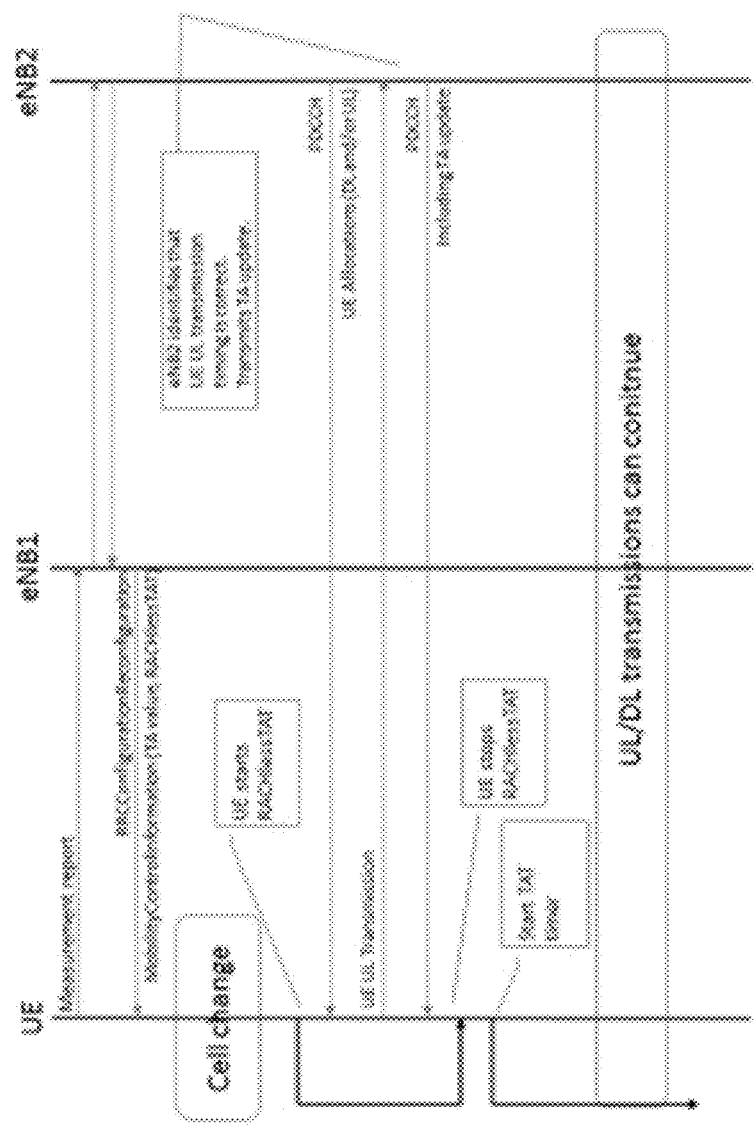
FIG. 3 illustrates using a RACHlessTAT timer in the event that a user equipment receives a new time-alignment update before the RACHlessTAT timer expires, in accordance with certain embodiments of the present invention.

FIG. 3 illustrates using a RACHlessTAT timer in the event that a user equipment receives a new time-alignment update before the RACHlessTAT timer expires (a "successful" case), in accordance with certain embodiments of the present invention. With a successful case, the UE receives new TA update before RACHlessTAT expires. A user equipment (UE) may receive a RRCConfiguration-Reconfiguration message from a base station (such as eNB1), where the message may indicate a handover. The UE may also receive mobility control information (for example, including new information elements such as a TA value and/or a RACHlessTAT) from eNB1. In other embodiments, the TA value may be transmitted by another base station (such as eNB2). In certain embodiments, the TA value may be transmitted (by eNB2, for example) without the UE performing an RA procedure. Next, a cell change may occur. The UE may then start the RACHlessTAT timer. Prior to the RACHlessTAT expiration, the UE may send an UL Transmission to another base station (such as eNB2). eNB2 may receive the UL Transmission and determine whether or not the UE's UL transmission timing is correct. If the UL timing alignment is correct, eNB2 may transmit a TA update to the UE. The UE may apply the TA update, and UL/DL transmission may continue.

Figure 4:
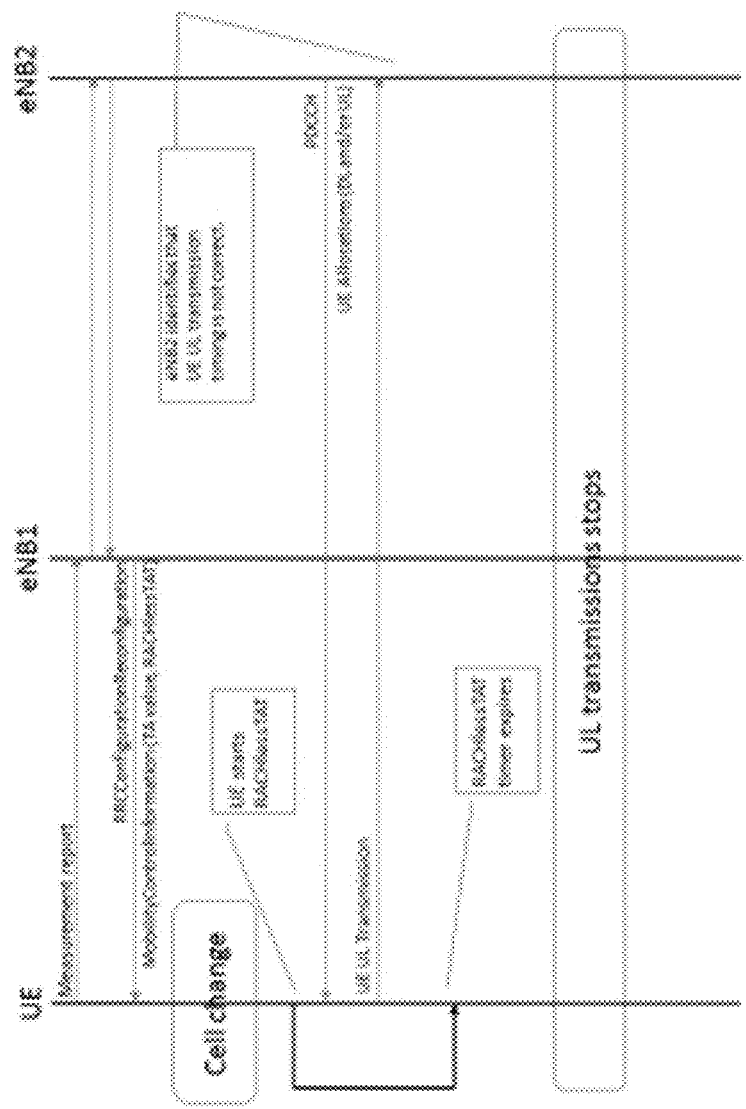
FIG. 4 illustrates using a RACHlessTAT timer in the event that a user equipment does not receive a new time-alignment update before the RACHlessTAT timer expires, in accordance with certain embodiments of the present invention.

FIG. 4 illustrates using a RACHlessTAT timer in the event that a user equipment does not receive a new time-alignment update before the RACHlessTAT timer expires, in accordance with certain embodiments of the present invention. Prior to the RACHlessTAT expiration, the UE may send an UL Transmission to another base station (such as eNB2). If eNB2 determines that UE's UL transmission timing is not correct (or if the eNB2 does not receive UL transmissions from the UE), then eNB2 will not transmit a TA update to the UE. Because the UE does not receive a new/update TA value from the network, the RACHlessTAT timer may then expire, as the UE has not received a TA update.

With such an unsuccessful case, if the UE has additional UL data to transmit, the UE may initiate normal actions when the UE is in need of UL resource, for example, use a normal UL resource request method. Similarly, if the network has any DL data to transmit to the UE, the network may initiate DL data transmissions.

In one embodiment of the present invention, the accuracy requirements concerning UE transmit timing accuracy could be similar to existing transmit timing requirements for a UE's first transmission in a discontinuous reception (DRX) cycle. Table 36.133 illustrates some example requirements.

Additionally, the actual accuracy of the used TA could be the same as the accuracy that is currently required in order to limit any potential network impact (or to ensure that there is no impact on the eNB side).

The eNB and UE procedures may have a limited impact on the specification. There may be a need to define a new timer (here referred to as "RACHlessTAT"). This new timer may be signaled to the UE (alternatively, the new timer may be defined in specification). The specification may also describe the above procedure such that, after RACHlessHO, the network updates TA within a given time, otherwise the UE stops UL transmissions.

In view of the above, certain embodiments of the present invention may guard/ensure against UE using an incorrect UL TA (that is used, for example, in connection with RA less handover) in order to protect eNB. Certain embodiments of the present invention may reduce UL interference in the event that a wrong TA is applied. Certain embodiments of the present invention may provide clear UE behavior.

Figure 6:
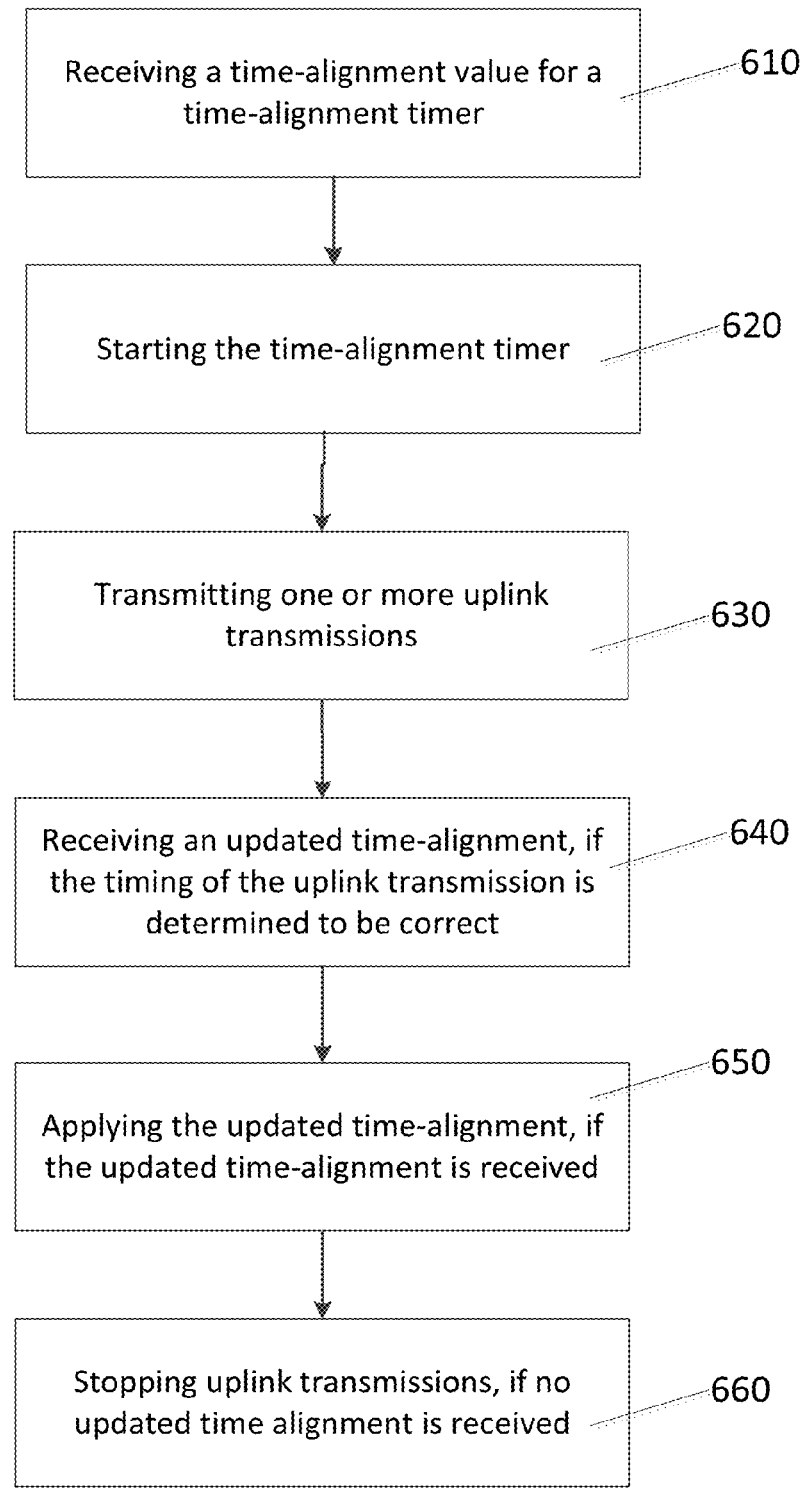
FIG. 6 illustrates a flowchart of a method in accordance with certain embodiments of the invention.

FIG. 6 illustrates a flowchart of a method in accordance with embodiments of the invention. The method illustrated in FIG. 6 includes, at 610, receiving, by a user equipment, a time-alignment value for a time-alignment timer to be used in another cell (for example, a handover target cell). In certain embodiments, the time-alignment value may be received from, for example, a handover target cell. The method may also include, at 620, starting the time-alignment timer. The method may also include, at 630, transmitting one or more uplink transmissions. The uplink transmission is transmitted while the time-alignment timer is running. The method may also include, at 640, receiving an updated time-alignment while the time-alignment timer is running, if the timing of the uplink transmission is determined to be correct. The method may also include, at 650, applying the updated time-alignment, if the updated time-alignment is received. The method may also include, at 660, stopping uplink transmissions, if no updated time alignment is received.

Figure 7:
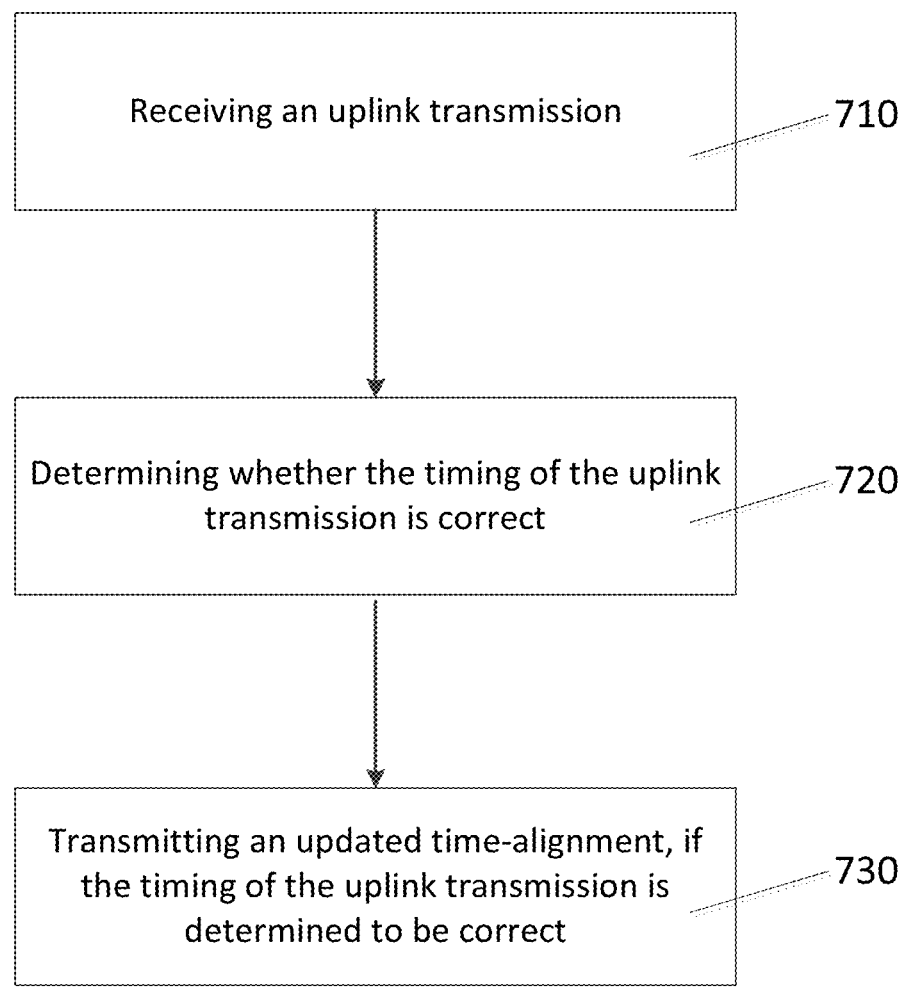
FIG. 7 illustrates a flowchart of a method in accordance with certain embodiments of the invention.

FIG. 7 illustrates a flowchart of a method in accordance with embodiments of the invention. The method illustrated in FIG. 7 includes, at 710, receiving, by a network node, an uplink transmission from a user equipment. The uplink transmission is transmitted while a time-alignment-timer is running. The method may also include, at 720, determining whether the timing of the uplink transmission is correct. The method may also include, at 730, transmitting an updated time-alignment to the user equipment, if the timing of the uplink transmission is determined to be correct.

Figure 8:
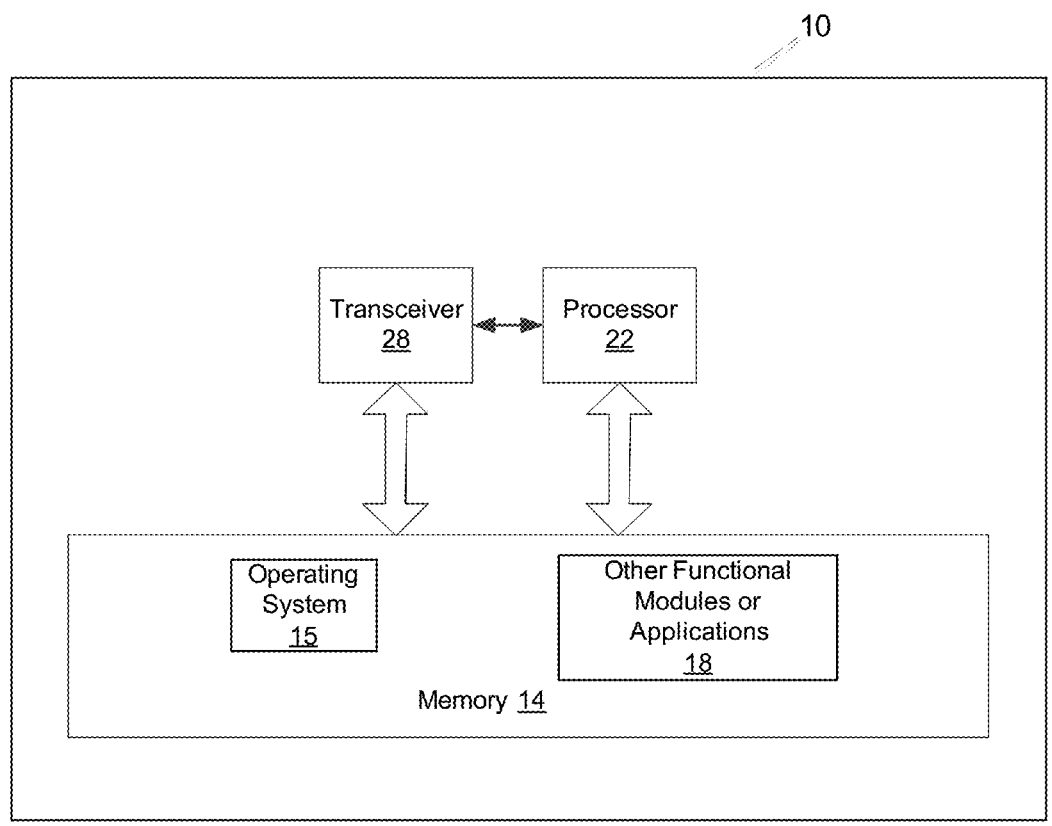
FIG. 8 illustrates an apparatus in accordance with certain embodiments of the invention.

FIG. 8 illustrates an apparatus in accordance with certain embodiments of the invention. In one embodiment, the apparatus can be a user equipment, a base station, and/or an evolved Node B (eNB), for example. Apparatus 10 can include a processor 22 for processing information and executing instructions or operations. Processor 22 can be any type of general or specific purpose processor. While a single processor 22 is shown in FIG. 8, multiple processors can be utilized according to other embodiments. Processor 22 can also include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 can further include a memory 14, coupled to processor 22, for storing information and instructions that can be executed by processor 22. Memory 14 can be one or more memories and of any type suitable to the local application environment, and can be implemented using any suitable volatile or nonvolatile data storage technology such as a semiconductor-based memory device, a magnetic memory device and system, an optical memory device and system, fixed memory, and removable memory. For example, memory 14 include any combination of random access memory (RAM), read only memory (ROM), static storage such as a magnetic or optical disk, or any other type of non-transitory machine or computer readable media. The instructions stored in memory 14 can include program instructions or computer program code that, when executed by processor 22, enable the apparatus 10 to perform tasks as described herein.

Apparatus 10 can also include one or more antennas (not shown) for transmitting and receiving signals and/or data to and from apparatus 10. Apparatus 10 can further include a transceiver 28 that modulates information on to a carrier waveform for transmission by the antenna(s) and demodulates information received via the antenna(s) for further processing by other elements of apparatus 10. In other embodiments, transceiver 28 can be capable of transmitting and receiving signals or data directly.

Processor 22 can perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 can store software modules that provide functionality when executed by processor 22. The modules can include an operating system 15 that provides operating system functionality for apparatus 10. The memory can also store one or more functional modules 18, such as an application or program, to provide additional functionality for apparatus 10. The components of apparatus 10 can be implemented in hardware, or as any suitable combination of hardware and software.

Figure 9:
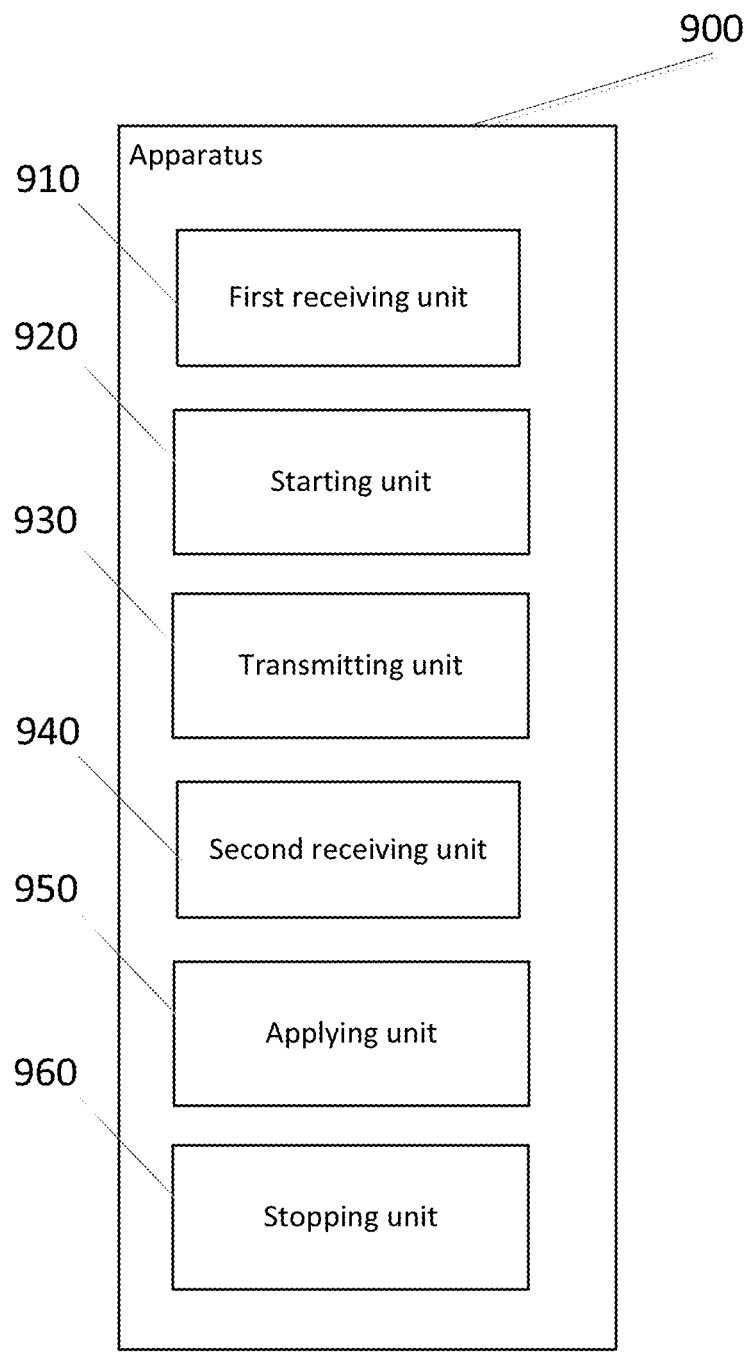
FIG. 9 illustrates an apparatus in accordance with certain embodiments of the invention.

FIG. 9 illustrates an apparatus in accordance with embodiments of the invention. Apparatus 900 can be a network element/entity such as a user equipment, for example. Apparatus 900 can include a first receiving unit 910 that receives a time-alignment value for a time-alignment timer to be used in another cell. Apparatus 900 may also include a starting unit 920 that starts the time-alignment timer. Apparatus 900 may also include a transmitting unit 930 that transmits one or more uplink transmissions. The uplink transmission is transmitted while the time-alignment timer is running. Apparatus 900 may also include a second receiving unit 940 that receives an updated time-alignment while the time-alignment timer is running, if the timing of the uplink transmission is determined to be correct. Apparatus 900 may also include an applying unit 950 that applies the updated time-alignment, if the updated time-alignment is received. Apparatus 900 may also include a stopping unit 960 that stops uplink transmissions, if no updated time alignment is received.

Figure 10:
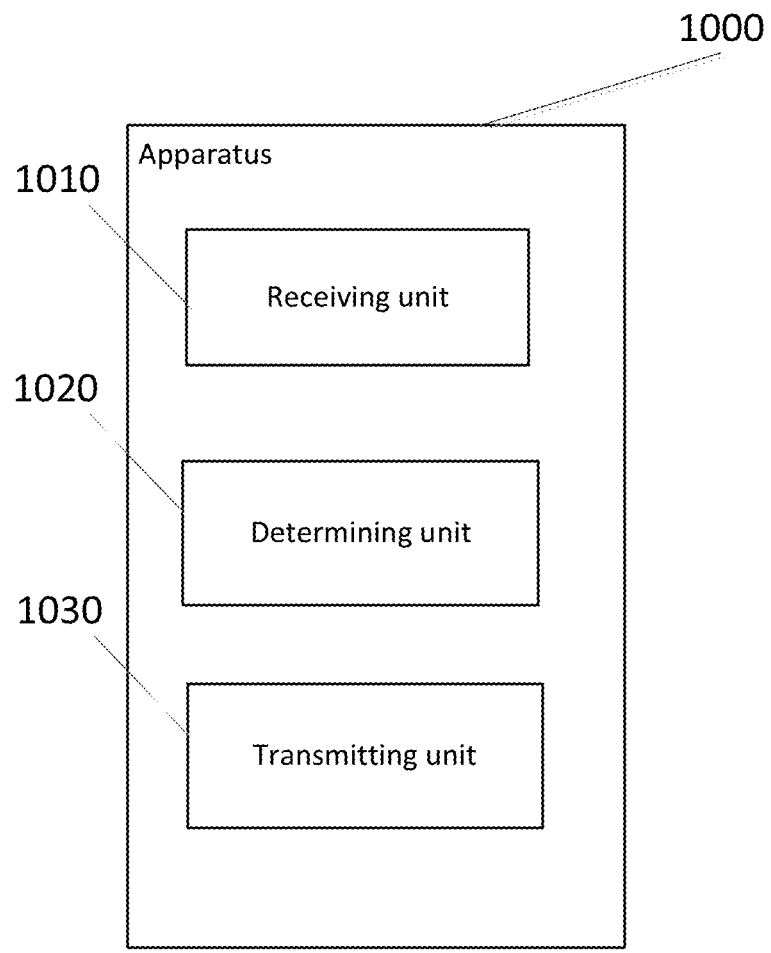
FIG. 10 illustrates an apparatus in accordance with certain embodiments of the invention.

FIG. 10 illustrates an apparatus in accordance with embodiments of the invention. Apparatus 1000 can be a network element/entity, for example. Apparatus 1000 can include a receiving unit 1010 that receives an uplink transmission from a user equipment. The uplink transmission is transmitted while a time-alignment-timer is running. Apparatus 1000 may also include a determining unit 1020 that determines whether the timing of the uplink transmission is correct. Apparatus 1000 may also include a transmitting unit 1030 that transmits an updated time-alignment to the user equipment, if the timing of the uplink transmission is determined to be correct.

The described features, advantages, and characteristics of the invention can be combined in any suitable manner in one or more embodiments. One skilled in the relevant art will recognize that the invention can be practiced without one or more of the specific features or advantages of a particular embodiment. In other instances, additional features and advantages can be recognized in certain embodiments that may not be present in all embodiments of the invention. One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method, comprising:
   receiving, by a user equipment, a time-alignment value for a time-alignment timer;
   starting the time-alignment timer;
   transmitting one or more uplink transmissions, wherein the uplink transmission is transmitted while the time-alignment timer is running;
   receiving an updated time-alignment while the time-alignment timer is running, if the timing of the uplink transmission is determined to be correct;
   applying the updated time-alignment, if the updated time-alignment is received; and
   stopping uplink transmissions, if no updated time alignment is received.

2. The method according to claim 1, further comprising receiving a handover command, wherein the handover command indicates a random-access-less handover.

3. The method according to claim 1, wherein the starting the time-alignment-timer comprises starting random-access-channel-less timing advance guard timer.

4. The method according to claim 1, wherein the receiving the time-alignment value comprises receiving from a first evolved Node B or a second evolved Node B, the transmitting the uplink transmission comprises transmitting to the second evolved Node B, and the second evolved Node B determines if the timing of the uplink transmission is correct.

5. An apparatus, comprising:
   at least one processor; and
   at least one memory including computer program code,
   the at least one memory and the computer program code configured, with the at least one processor, to cause the apparatus at least to
   receive a time-alignment value for a time-alignment timer;
   start the time-alignment timer;
   transmit one or more uplink transmissions, wherein the uplink transmission is transmitted while the time-alignment timer is running;
   receive an updated time-alignment while the time-alignment timer is running, if the timing of the uplink transmission is determined to be correct;
   apply the updated time-alignment, if the updated time-alignment is received; and
   stop uplink transmissions, if no updated time alignment is received.

6. The apparatus according to claim 5, wherein the apparatus is further caused to receive a handover command, wherein the handover command indicates a random-access-less handover.

7. The apparatus according to claim 5, wherein the starting the time-alignment-timer comprises starting random-access-channel-less timing advance guard timer.

8. The apparatus according to claim 5, wherein the receiving the time-alignment value comprises receiving from a first evolved Node B or a second evolved Node B, the transmitting the uplink transmission comprises transmitting to the second evolved Node B, and the second evolved Node B determines if the timing of the uplink transmission is correct.

9. A method, comprising:
   receiving, by a network node, an uplink transmission from a user equipment, wherein the uplink transmission is transmitted while a time-alignment-timer is running;
   determining whether the timing of the uplink transmission is correct; and
   transmitting an updated time-alignment to the user equipment, if the timing of the uplink transmission is determined to be correct.

10. The method according to claim 9, wherein the receiving the uplink transmission from the user equipment comprises receiving the uplink transmission after the user equipment receives a handover command, wherein the handover command indicates a random-access-less handover.

11. The method according to claim 9, wherein the receiving the uplink transmission comprises receiving the uplink transmission while a random-access-channel-less timing advance guard timer is running.

12. An apparatus, comprising:
    at least one processor; and
    at least one memory including computer program code,
    the at least one memory and the computer program code configured, with the at least one processor, to cause the apparatus at least to
    receive an uplink transmission from a user equipment, wherein the uplink transmission is transmitted while a time-alignment-timer is running;
    determine whether the timing of the uplink transmission is correct; and
    transmit an updated time-alignment to the user equipment, if the timing of the uplink transmission is determined to be correct.

13. The apparatus according to claim 12, wherein the receiving the uplink transmission from the user equipment comprises receiving the uplink transmission after the user equipment receives a handover command, wherein the handover command indicates a random-access-less handover.

14. The apparatus according to claim 13, wherein the receiving the uplink transmission comprises receiving the uplink transmission while a random-access-channel-less timing advance guard timer is running.

* * * * *